United States Patent [19]

Meulendyk

[11] 3,836,074
[45] Sept. 17, 1974

[54] BI-THERMAL BLEED VALVE
[75] Inventor: John W. Meulendyk, Kalamazoo, Mich.
[73] Assignee: Pneumo Dynamics Corporation, Cleveland, Ohio
[22] Filed: Aug. 30, 1972
[21] Appl. No.: 284,898

[52] U.S. Cl.............. 236/93, 236/102, 137/468
[51] Int. Cl............................................ F25b 41/04
[58] Field of Search........... 137/468; 236/93, 101 R, 236/102

[56] References Cited
UNITED STATES PATENTS
| | | | |
|---|---|---|---|
| 1,712,313 | 5/1929 | Smith | 236/102 |
| 1,888,225 | 11/1932 | Hetherington | 236/93 |
| 2,262,460 | 11/1941 | Johnson | 236/93 |
| 2,986,380 | 5/1961 | Read | 236/93 X |

Primary Examiner—Harold W. Weakley
Attorney, Agent, or Firm—Donnelly, Maky, Renner & Otto

[57] ABSTRACT

A bleed valve having three modes of operation at different temperature levels. The valve plunger has a high coefficient of expansion relative to the body support structure and abuts a spring loaded valve seat at normal operating temperatures. The valve is opened at low temperature levels by normal spacing of the plunger away from the valve seat, closes upon predetermined heat-produced expansion, and at high temperature levels reopens by further expansion that causes cocking of the valve seat.

4 Claims, 3 Drawing Figures

PATENTED SEP 17 1974

3,836,074

BI-THERMAL BLEED VALVE

BACKGROUND OF THE INVENTION

This invention relates to fluid valves and more particularly to relief valves, operable on the principle of differential expansion, having three temperature modes of operation.

Thermal responsive valves are well established in the fluid control art providing alternate modes of operation for variations in temperature levels usually obtained by the expansion characteristics of metal components. As far as known, such valves are limited to only two modes of operation, and plural valves or additional apparatus such as electronic heat sensing devices and solenoids are necessary to satisfy the requirement for three or a greater number of operating modes.

In most applications, however, such additional apparatus is detrimental to operation of the system in reducing the reliability or efficiency of same and often weight and space are at such a premium that such solutions become burdensome. One such example is in the modern day aircraft which may have flight modes which could involve widely varying thermal environments for a hydraulic flight control surface actuator. Extremes of operation could be encountered in a very cold environment of high altitude subsonic flight and in a very hot environment in medium altitude supersonic flight. It would be advantageous to have in such a flight control actuator a single thermally responsive valve which could produce at normal temperatures, for example 0°–300° F, a valve closed condition conserving hydraulic supply power; at low temperatures on the order of below −20° F, a wideopen condition allowing flow of oil from the central hydraulic supply through the actuator and its supply lines preventing extremely low oil temperature levels; and at high temperatures on the order of above 400° F, a partially open valve condition allowing oil flow to the central hydraulic supply for cooling purposes.

SUMMARY OF THE INVENTION

Therefore it is one object of this invention to provide a new form of fluid valve which has several temperature dependent operating modes.

It is another object of this invention to provide a fluid valve which operates on the principle of differential expansion in a particular mechanical configuration for providing three temperature dependent operating modes.

It is still another object of this invention to provide a valve, for example, for hydraulic fluid, having three operating modes in which the valve and valve seat may be spaced apart, in abutment, or in relatively cocked relation to provide full, closed, and partial flow conditions.

It is a further object of this invention to provide such a fluid valve in which several relative positions of a valve closure member and the valve seat are effected by a device having a relatively high temperature coefficient of expansion.

These and other objects are realized in the instant invention in a bleed valve having capability for three distinct temperature related modes of operation in the same direction of temperature change, with positive mechanical interaction in one mode for such extended range operation.

In general, this unique capability permits a fluid-connected device to employ the fluid, assumed to be temperature controlled or otherwise maintained within relatively narrow limits, to stabilize the temperature of the device in spite of ambient or other conditions which heat or cool the device.

In the preferred embodiment of the invention a plunger expansible and contractible with temperature in a bore is spaced from or abuts a valve seat positioned under bias at the end of the bore. When retracted within the bore, the plunger normally allows fluid flow through the central portion thereof, such flow being terminated by the abutment of the expanding plunger with the valve seat in a higher intermediate temperature range, while continued expansion of the plunger in the same direction further drives the valve seat against a stop member to cause cocking of the former and re-establish fluid flow again through the valve.

Other objects and advantages of the present invention will become apparent as the following description proceeds.

To the accomplishment of the foregoing and related ends, the invention then comprises the features hereinafter fully described, the following description and the annexed drawing setting forth in detail a certain illustrative embodiment of the invention, this being indicative, however, of but one of the various ways in which the principles of the invention may be employed.

DESCRIPTION OF THE PREFERRED EMBODIMENT

Figure 1:
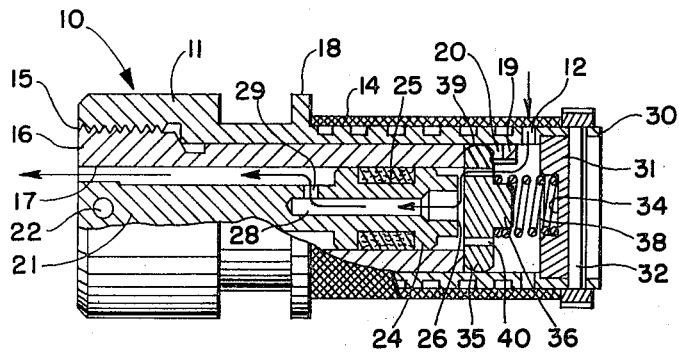
FIG. 1 is a cross-sectional view of the preferred embodiment of the invention showing the valve in full open condition at low temperature levels.
Figure 2:
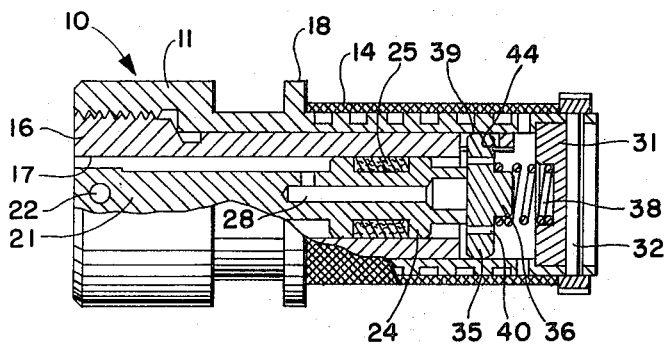
FIG. 2 is a cross-sectional view of the preferred embodiment of the invention showing the valve in the closed condition at normal temperature levels.
Figure 3:
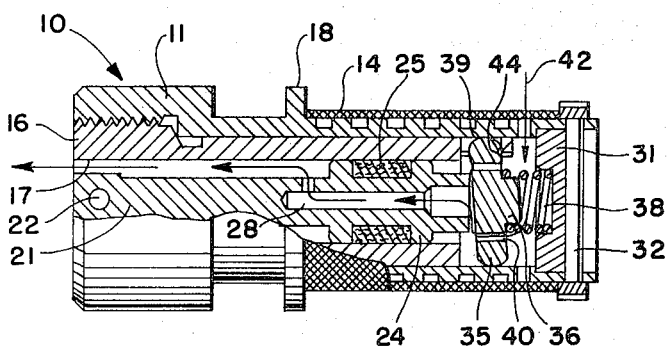
FIG. 3 is a cross-sectional view of the preferred embodiment of the invention showing the valve in the partially open condition at high temperature levels.

Referring now to FIGS. 1–3 there is shown a preferred embodiment of the bi-thermal bleed valve 10 in the three operating modes obtained at low, normal and high operating temperatures. The bleed valve 10 comprises a housing sleeve 11, having an inlet port 12 adjacent one end with a filter screen 14 disposed thereabout, adapted for connection to a source of fluid which may be practically any fluid supply, control or actuation apparatus in which fluid flow is to be controlled as a function of fluid or ambient temperature levels.

The sleeve 11 is threaded at one end 15 and receives therein in firm engagement a partly threaded cylinder 16 having an axially extending central bore 17 forming a path therethrough for fluid flow from the inlet port 12 to a further portion of a fluid related apparatus. The housing 11 is relieved at its periphery forming a flange 18 for retaining a filter screen 14 and a connector for mounting in fluid supply apparatus in conventional manner. There is a stop 19 spaced from the inner end of the cylinder 16 at the inner surface of sleeve 11, at the top as shown, of limited radial extent and providing a recess 20 at this location, the projection 19 serving as a stop member for purposes to be described.

Located within the bore 17 of the cylinder 16 is a plunger 21 of generally cylindrical configuration being secured to the cylinder 16 at one end by means of a pin 22 and including a pair of flanges 24 adjacent the other end engaging the bore 17 of the cylinder 16 and serving to retain packing material 25 in a fluid-tight, slidable junction. At low temperature levels the plunger 21 is substantially shorter in length than the cylinder, the end 26 disposed within the cylinder forming the valve closure means for the fluid valve 10. The plunger 21 further including a bore 28 centrally disposed therein spanning the width of the pair of flanges 24 and communicating with the annular space within bore 17 of the cylinder 16 by means of an exit port or ports 29.

The housing sleeve 11 is radially recessed at the end 30 opposite the threaded end 15 and receives therein a cylindrical spring retainer 31 secured by a pin 32 passing through the housing 11 and having a cup recess 34 in the central interior portion thereof. A disc shaped valve seat 35 forms the cooperating member or seat for the valve closure 26 and includes a central projection 36 which serves to retain a compression spring 38, the other end of which is disposed in the recess 34 of the spring retainer 31. The exterior diameter of the valve seat 35 is dimensioned to provide a sliding fit within the inside of the housing sleeve 11, while the periphery 39 of the valve seat 35 axially curved to form a radius to allow tilting or cocking of the valve seat 35 relative to the housing 11 and cylinder 16 and thus to the plunger 21 as will be further explained. The valve seat 35 includes axially disposed ports 40 therethrough to complete the bleed path for fluid flow from the inlet port 12 to the exit of the bore 17 in the cylinder 16 as indicated by the arrows in FIG. 1.

The plunger 21 is selected from a material having a high temperature coefficient of expansion relative to the material forming the cylinder 16 of the fluid valve in order to provide differential expansion characteristics for control of the valve 10 as a function of the temperature of fluid passing therethrough or the environmental temperature of the valve. Suitable materials for the plunger 21 and cylinder 16 providing sufficient differential expansion could be aluminum and titanium, while the remainder of the valve 10 as, for example, the valve seat 35 and pins 22, 32 for retaining components thereof have little effect upon the axial differential expansion characteristics and may be selected as appropriate. Moreover, the valve closure on the seat coacting therewith can be formed of a suitable resilient member of sufficient hardness to perform as described.

FIG. 1 shows the low temperature mode of operation of the valve which might occur, for example, in the temperature range of up to −21° F, with plunger 21 of a minimal length so that the valve closure 26 of plunger 21 is withdrawn within the bore 17 to create a fully open condition between the valve closure and the valve seat 35 to allow full fluid flow as indicated by the arrows. The valve seat 35, which is positioned in the aperture 20 in the projection 19 of the cylinder 16 is urged by the bias of the compression spring 38 against the end face of the cylinder 16 and assumes a normal orientation under such bias transverse to the axis of the valve.

At normal temperature levels, e.g., in the range of 0°–300° F, as shown in FIG. 2, the plunger 21 is thermally expanded to move the valve closure beyond the end of the cylinder 16 and firmly in engagement with the valve seat 35, urging the latter against the bias of the spring 38 to a position intermediate the end wall of the cylinder 16 and the stop 19. In this mode of operation the valve seat 35 remains in its normal disposition transverse to the axis of the valve, but with fluid flow prevented at the now closed bore 28 and the packing 25 surrounding the plunger 21.

The high temperature mode of operation of the valve 10 is depicted in FIG. 3, this occurring for example in a range of over 400° F. Further thermal extension of the plunger 21 due to the higher temperature has urged the valve seat 35 into engagement with the limited stop 19. Continued expansion in the same direction of the plunger 21 causes the valve seat 35 to assume the cocked position depicted in FIG. 3. In this mode of operation the valve seat 35 is tilted with respect to the plunger 21 sufficiently to provide a partially open condition at the seat for fluid flow as shown by the arrows 42. The degree of cocking of the valve seat 35 will depend upon further expansion of the plunger 21, such movement being allowed by the curved periphery 39 of the valve seat 35 and preferably being facilitated by a groove 44 in the valve seat 35 adjacent the periphery thereof, preventing binding against the stop 19.

Such action of the fluid valve 10 is, of course, reversible and, upon attaining a lower temperature level, a normal valve closed configuration will again be achieved as depicted in FIG. 2 or the open position of FIG. 1 at a still lower temperature.

The embodiments of the invention in which an exclusive property or privilege is claimed are defined as follows:

1. A fluid valve for controlling flow above and below a nominal temperature, comprising a housing, a cylinder having a bore therein secured in said housing, a plunger having a relatively high temperature coefficient of expansion adapted for linear expansion and compression in said bore, said plunger forming the valve closing portion of the valve, a valve seat, means biasing said valve seat toward said cylinder and allowing rearward movement of said valve seat upon urging of said plunger, and stop means in the path of rearward movement of said valve seat, said stop means adapted to restrain movement of only a portion of said valve seat thereby to cause cocking of same relative to said seat.

2. A valve as set forth in claim 1, wherein said valve portion of said plunger is adapted for movement into and out of said cylinder upon contraction and expansion of said plunger, valve seat comprises a disc adapted for substantially transverse sliding movement in said housing toward and away from said cylinder, said disc being tiltable in said housing when biased between said stop means and said plunger upon predetermined expansion of the latter.

3. A valve as set forth in claim 2, wherein said plunger further comprises sealing means thereon for preventing fluid flow through said bore and a bore therein spanning said sealing means, said bore being in communication with both ends of said cylinder for directing fluid flow therethrough.

4. A valve as set forth in claim 3, wherein said valve seat comprises a central portion adapted for engagement with said valve portion of said plunger to prevent fluid flow therethrough, said valve seat being apertured outside said central portion for flow of fluid to said plunger.

* * * * *